(12) United States Patent
Kane

(10) Patent No.: US 11,902,480 B2
(45) Date of Patent: Feb. 13, 2024

(54) DEVICES, SYSTEMS, AND METHODS FOR FORECASTING DEVICE FAILURES

(71) Applicant: Canon Solutions America, Inc., Melville, NY (US)

(72) Inventor: Jeffrey David Kane, Boynton Beach, FL (US)

(73) Assignee: Canon Solutions America, Inc., Melville, NY (US)

( * ) Notice: Subject to any disclaimer, the term of this patent is extended or adjusted under 35 U.S.C. 154(b) by 0 days.

(21) Appl. No.: 17/865,227

(22) Filed: Jul. 14, 2022

(65) Prior Publication Data

US 2022/0360674 A1 Nov. 10, 2022

Related U.S. Application Data

(63) Continuation of application No. 16/924,791, filed on Jul. 9, 2020, now Pat. No. 11,431,858.

(51) Int. Cl.
*H04N 1/00* (2006.01)

(52) U.S. Cl.
CPC .............................. *H04N 1/00344* (2013.01)

(58) Field of Classification Search
CPC ................................................ H04N 1/00344
USPC ..................................................... 358/1.15
See application file for complete search history.

(56) References Cited

U.S. PATENT DOCUMENTS

| 8,126,199 | B2 ‡ | 2/2012 | Wu ........................ | B41J 2/2142 |
| | | | | 347/15 |
| 8,643,852 | B2 ‡ | 2/2014 | Mestha ..................... | G01J 3/46 |
| | | | | 358/1.9 |
| 10,416,600 | B2 ‡ | 9/2019 | Shibuya ............. | G03G 15/5004 |
| 2007/0292145 | A1* | 12/2007 | Drose ................ | G03G 15/5079 |
| | | | | 399/9 |
| 2019/0271932 | A1 ‡ | 9/2019 | Tanaka .................. | G03G 15/553 |
| 2020/0012457 | A1* | 1/2020 | Ota ...................... | G06F 11/0751 |
| 2020/0174488 | A1 ‡ | 6/2020 | Yoo ........................ | G01S 13/867 |
| 2020/0257586 | A1* | 8/2020 | Kobayashi ............. | G06N 20/00 |
| 2020/0379454 | A1* | 12/2020 | Trinh .................... | G05B 23/024 |
| 2021/0103794 | A1 ‡ | 4/2021 | Jung .................... | G06N 3/0454 |

\* cited by examiner
‡ imported from a related application

*Primary Examiner* — Jacky X Zheng
(74) *Attorney, Agent, or Firm* — Canon U.S.A., Inc. IP Division

(57) ABSTRACT

Devices, systems, and methods obtain sensor data that were generated by a plurality of sensors; obtain event data that include occurrences of an event; calculate first characteristics of the sensor data that were generated by the plurality of sensors within a temporal range of an occurrence of the event; identify, in the sensor data, sensor data that were generated by the plurality of sensors within the temporal range of at least one other occurrence of the event based on the first characteristics; calculate second characteristics of the sensor data that were generated by the plurality of sensors within the temporal range of the at least one other occurrence of the event, normalize at least some of the sensor data based on the first characteristics and on the second characteristics, thereby generating normalized sensor data, and train a machine-learning model based on the normalized sensor data.

20 Claims, 10 Drawing Sheets

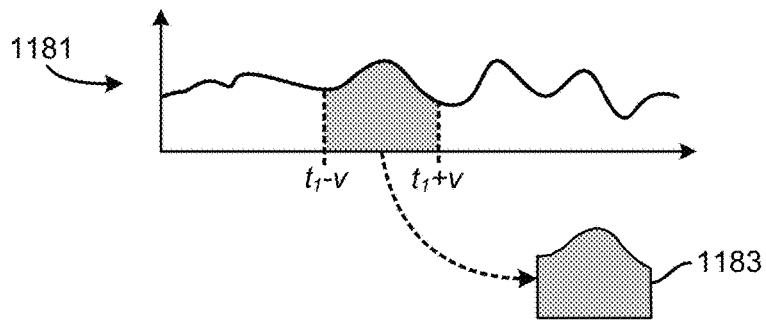
FIG. 4A
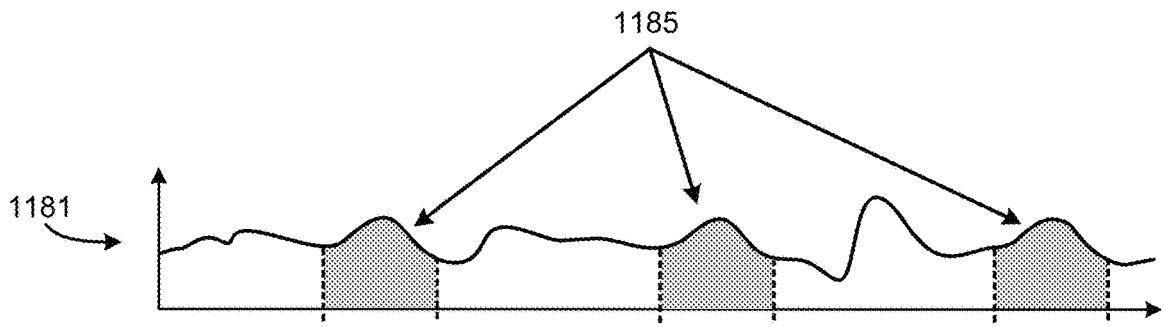
FIG. 4B
| Time | Reading | Characteristic |
|---|---|---|
| 2016-01-06, 15:32:14.66 | 5.06 | |
| 2016-01-06, 19:32:15.22 | 5.21 | |
| 2016-01-07, 05:24:08.87 | 7.32 | 13.564 |
| 2016-01-07, 12:09:58.12 | 5.15 | |
| 2016-01-07, 17:41:12.45 | 5.19 | |
FIG. 4C

DEVICES, SYSTEMS, AND METHODS FOR FORECASTING DEVICE FAILURES

CROSS-REFERENCE TO RELATED APPLICATIONS

This application is a continuation of U.S. application Ser. No. 16/924,791, which was filed on Jul. 9, 2020.

BACKGROUND

Technical Field

The present disclosure relates generally to devices, systems, and methods for predicting failures of a device or system, such as an image-forming device.

Background

Modern machines and systems utilize various sensors to measure a number of properties, detect events or changes in an environment, and output information related to the measurements. For example, conventional image-forming devices (e.g., printers, copiers, multifunction peripherals) may include various sensors to monitor aspects of the device. Based on a sensor detecting that a threshold has been met, the image-forming device may be stopped or adjusted. For example, a temperature sensor may detect that a threshold temperature has been met for a particular component of the device. In response, the device may be stopped to prevent component failure or to reduce damaging components or mechanics of the device. Additionally, in some cases, adjustments may be made to the device while the device is running. For example, print belt sensors provide data to adjustment motors to make sure the paper is aligned correctly (steered) during printing.

In conventional systems, the above-described sensors often sense that a threshold is met only one to five seconds before the occurrence of the event that the stop and adjustment measures are intended to avoid. In some instances, a warning of only a few seconds may be insufficient to avoid damaging components of the device, which may result in downtime of the entire device or unavailability of affected features or components, and may necessitate expensive repairs. Moreover, because sensors in conventional systems may show an error only within a few seconds of the actual failure, effective monitoring and maintenance scheduling for the image-forming device may be inhibited.

SUMMARY

Some embodiments of a device comprise one or more computer-readable media; and one or more processors in communication with the one or more computer-readable media. The one or more computer-readable media and the one or more processors are configured to cause the device to obtain sensor data that were generated by a plurality of sensors; obtain event data that include occurrences of an event; identify, in the sensor data, sensor data that were generated by the plurality of sensors within a temporal range of an occurrence, of the occurrences, of the event; calculate first characteristics of the sensor data that were generated by the plurality of sensors within the temporal range of the occurrence of the event; identify, in the sensor data, sensor data that were generated by the plurality of sensors within the temporal range of at least one other occurrence, of the occurrences, of the event based on the first characteristics; calculate second characteristics of the sensor data that were generated by the plurality of sensors within the temporal range of the at least one other occurrence of the event; normalize at least some of the sensor data based on the first characteristics and on the second characteristics, thereby generating normalized sensor data; calculate respective correlations between the sensor data of the plurality of sensors that are within the temporal range of the occurrence of the event or the at least one other occurrence of the event; and train a machine-learning model based on the normalized sensor data and on the respective correlations.

Some embodiments of a method comprise obtaining sensor data that were generated by a plurality of sensors; obtaining event data that includes occurrences of an event; calculating, for each sensor of the plurality of sensors, respective characteristics of the sensor data that were generated by the sensor within a temporal range of a respective occurrence of the occurrences of the event; calculating respective correlations between at least some of the sensor data; normalizing at least some of the sensor data based on the characteristics, thereby generating normalized sensor data; and training a machine-learning model based on the normalized sensor data.

Some embodiments of one or more computer-readable storage media store instructions that, when executed by one or more computing devices, cause the one or more computing devices to perform operations that comprise obtaining sensor data that were generated by a plurality of sensors; obtaining event data that include occurrences of an event; calculating, for each of one or more sensors of the plurality of sensors, respective characteristics of the sensor data that were generated by the sensor within a temporal range of a respective occurrence of the occurrences of the event; calculating respective correlations between at least some of the sensor data; normalizing at least some of the sensor data based on the characteristics, thereby generating normalized sensor data; and training a machine-learning model based on the normalized training data, wherein the machine-learning model receives sensor data as inputs, and the machine-learning model outputs either a normal indicator or, alternatively, an abnormal indicator.

Further features of various embodiments will become apparent from the following description of exemplary embodiments with reference to the attached drawings, in which like reference characters designate the same or similar parts throughout the figures thereof.

BRIEF DESCRIPTION OF THE DRAWINGS

FIG. 4A illustrates an example embodiment of a characteristic of sensor data.

FIG. 4B illustrates an example embodiment of sensor data that include multiple occurrences of an event.

FIG. 4C illustrates an example embodiment of sensor data that includes characteristics for the negative training data and that does not include characteristics for positive training data.

DETAILED DESCRIPTION

Figure 1:
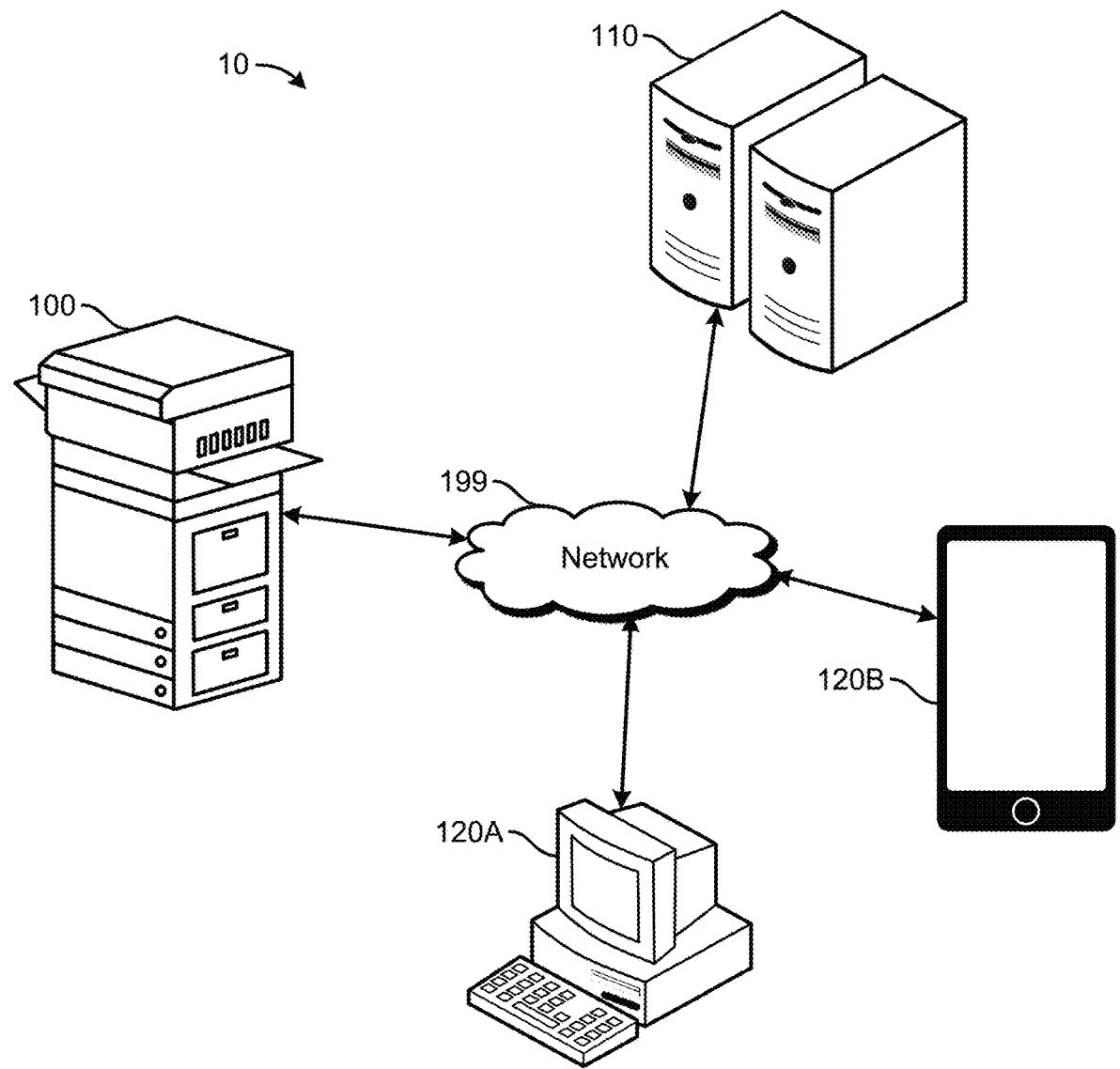
FIG. 1 illustrates an example embodiment of a system for predicting device events.

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein. Furthermore, some embodiments include features from two or more of the following explanatory embodiments.

Also, as used herein, the conjunction "or" generally refers to an inclusive "or," though "or" may refer to an exclusive "or" if expressly indicated or if the context indicates that the "or" must be an exclusive "or."

Additionally, in this description and the drawings, an alphabetic suffix on a reference number may be used to indicate a specific instance of the feature identified by the reference numeral. For example, the temperature sensors in a group of temperature sensors may be identified with the reference numeral 1021 when a particular temperature sensor is not being distinguished. However, 1021A may be used to identify a specific temperature sensor when the specific temperature sensor is being distinguished from the rest of the temperature sensors 1021.

FIG. 1 illustrates an example embodiment of a system for predicting device events (e.g., component failures). The system 10 includes a sensor-data-generating device 100, which includes one or more sensors; one or more forecasting devices 110, which are specially-configured computing devices (e.g., servers, mainframes, desktop computers, laptop computers, smartphones, tablet computers); and one or more client computing devices 120A-B. In this embodiment, the sensor-data-generating device 100, the one or more forecasting devices 110, and the one or more client computing devices 120A-B communicate via one or more networks 199, which may include a wired network, a wireless network, a LAN, a WAN, a MAN, and a PAN. Also, in some embodiments, the devices communicate via other wired or wireless channels.

In this embodiment, the sensor-data-generating device 100 is an image-forming device. Examples of an image-forming device include a laser printer, an inkjet printer, a multi-function device, a copier, and a three-dimensional printer. However, in some embodiments, the sensor-data-generating device 100 is not an image-forming device. Other examples of the sensor-data-generating device 100 include a robot, an engine, a server, a network switch, a router, a reactor, an automobile, an aircraft, and a watercraft.

The sensor-data-generating device 100 includes a plurality of sensors. Examples of sensors include the following: temperature sensors, position sensors, current sensors, voltage sensors, magnetometers, force sensors, airflow sensors, pressure sensors, touch sensors, strain sensors, torque sensors, flex sensors, photoelectric sensors, proximity sensors, moisture sensors, chemical sensors, and vibration sensors. The sensors monitor the components and operations of the sensor-data-generating device 100.

As the sensors monitor the components and operations of the sensor-data-generating device 100, the sensor-data-generating device 100 transmits the following to the one or more forecasting devices 110: (1) sensor data that were generated by the sensors and (2) event data that were generated based on the sensor data. An occurrence of an event is detected when the sensor data from one or more sensors indicate a particular reading, and an event interrupt read from an instance of an event may provide (or combine to provide) an actionable reaction to the event occurrence. For example, an event may be an overheating, and an occurrence of the overheating event may be detected when a temperature sensor senses a temperature that is equal to or greater than a threshold. The sensor-data-generating device 100 generates the event data in response to detecting the occurrence of the event. Also, for example, if the event code of the overheating event is 3384, and if three occurrences of the overheating event are detected at epochs $t_{10}$, $t_{32}$, and $t_{84}$, then the sensor-data-generating device 100 will send event data for three occurrences of event 3384. The event data for the first occurrence will include event code 3384 and epoch $t_{10}$, the event data for the second occurrence will include event code 3384 and epoch $t_{32}$, and the event data for the third occurrence will include event code 3384 and epoch $t_{84}$.

Based on the received sensor data (and the event data in some embodiments), the one or more forecasting devices 110 generate forecasts (predictions) of events (e.g., component failures) of the sensor-data-generating device 100. The forecasts may include a time and an event code. The one or more forecasting devices 110 send the forecasts to the one or more client computing devices 120A-B, which may display notifications of the forecast. For example, if the sensor-data-generating device 100 is located in an office building, a first client computing device 120A may be located in the office building and display notifications to a user in the office building. The second client computing device 120B may be carried by a service technician, who may also be notified of any forecast.

Thus, the one or more forecasting devices 110 can reduce the downtime and maintenance costs of the sensor-data-generating device 100. For example, the one or more forecasting devices 110 can reduce unscheduled downtime, which may require more expensive repairs (e.g., when the downtime happens outside of standard business hours and technicians charge additional service fees). Also, the one or more forecasting devices 110 can reduce a progression of failures (e.g., temporal cascading failures) in the sensor-data-generating device 100. For example, if the sensor-data-generating device 100 has a failure that causes it to abruptly stop, then even after the component that caused the failure has been repaired, the damage caused by the abrupt stop may in turn cause other components to fail—including components that do not normally fail or require routine maintenance.

The sensor-data-generating device 100 may continually send sensor data and event data to the one or more forecasting devices 110, and, as the sensor data is received, the one or more forecasting devices 110 may continually generate forecasts.

For example, some embodiments of the one or more forecasting devices 110 continually input the obtained sensor data into a machine-learning model that accepts the sensor data as inputs and that outputs one or more forecasts, thereby providing a constant monitoring of the sensor-data-generating device. Also, the one or more forecasting devices 110 may continually update the machine-learning model based on received sensor data, received event data, and previously-generated forecasts.

The sensor data may include data that were generated by the sensors at a set sampling interval (e.g., every millisecond, every second, every 2 seconds, every 10 seconds). Thus, although some of the drawings illustrate the sensor data as a continuous line, the sensor data may be discrete. Consequently, depending on the sampling interval at which a sensor generated sensor data, the sensor data of the sensor may not include any sensor data for a particular range of time. For example, if the interval is ten seconds, with data generated at t=0 seconds and t=10 seconds, and the particular range of time is ±2 seconds from t=5 seconds (range is t=3 to t=7), then the sensor data will not include any sensor data in the particular range. Furthermore, some embodiments generate continuous sensor data, for example by interpolating discrete sensor data.

Figure 2A:
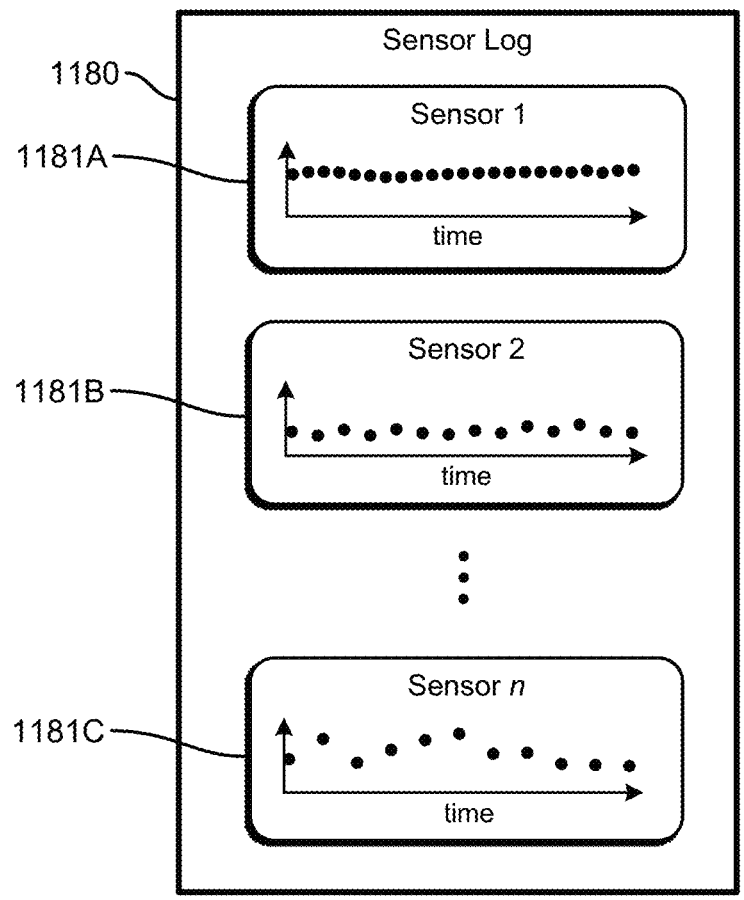
FIG. 2A illustrates an example embodiment of a sensor log that includes sensor data from n sensors.

The one or more forecasting devices 110 may store obtained sensor data in one or more sensor logs. For example, FIG. 2A illustrates an example embodiment of a sensor log 1180 that includes sensor data 1181 from n sensors (where n is a positive integer). In FIG. 2A, sensor 1 had a shorter sampling interval than sensor 2 and sensor n, and sensor 2 had a shorter sampling interval than sensor n. A sensor log 1180 may store sensor data 1181 in various forms, for example tables, arrays, linked lists, and XML files. Also, the sensor data 1181 from a group of sensors may be added to one sensor log. For example, if a sensor-data-generating device 100 includes 50 sensors, the sensors may be grouped into 5 groups of 10 sensors each, and the sensor-log data from the 10 sensors in a group may be stored in the same sensor log.

Figure 2B:
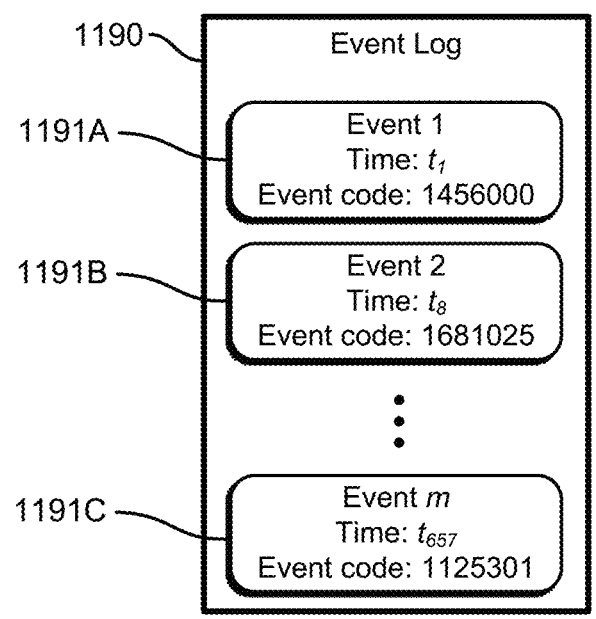
FIG. 2B illustrates an example embodiment of an event log that includes m occurrences of events.

Event data may include a time (e.g., epoch) and an event code, and the one or more forecasting devices 110 may store obtained event data in an event log. For example, FIG. 2B illustrates an example embodiment of an event log 1190 that includes event data 1191 for m occurrences of events (where m is a positive integer). The data 1191 of each occurrence include a time and an event code. Also, the data 1191 of each occurrence may include other information, such as a sensor reading that triggered the occurrence of the event. An event log 1190 may store the event data 1191 in various forms, for example tables, arrays, linked lists, and XML files.

Figure 3:
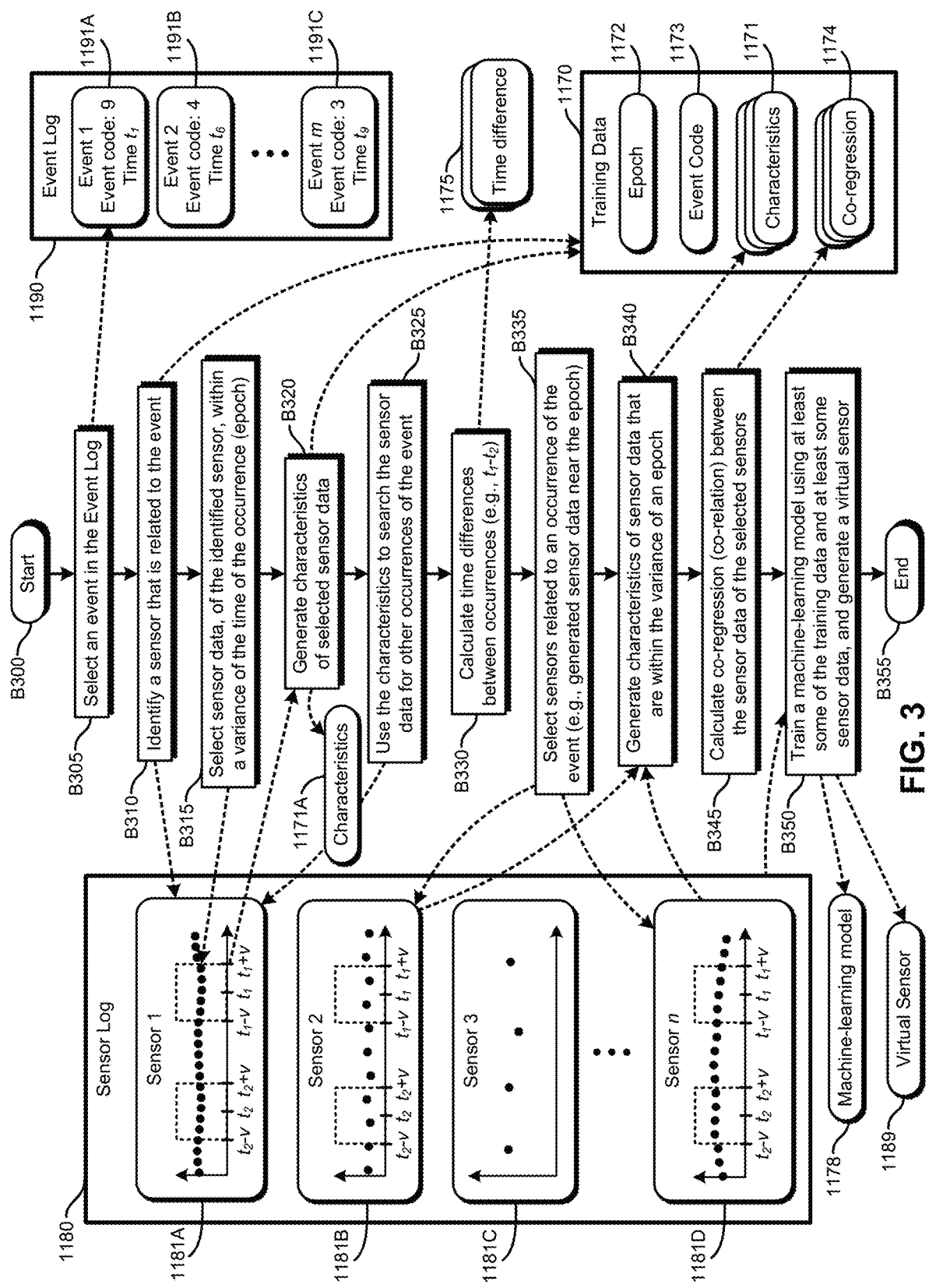
FIG. 3 illustrates an example embodiment of an operational flow for training a machine-learning model and generating a virtual sensor.

FIG. 3 illustrates an example embodiment of an operational flow for training a machine-learning model. Although this operational flow and the other operational flows that are described herein are each presented in a certain respective order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

Furthermore, although this operational flow and the other operational flows that are described herein are performed by a forecasting device, some embodiments of these operational flows are performed by two or more forecasting devices or by one or more other specially-configured computing devices.

The flow starts in block B300 and then moves to block B305, where the forecasting device selects an occurrence of an event in an event log 1190. In this example, the forecasting device selects the occurrence "event 1." Also, an event may indicate an error or a fault in the sensor-data-generating device. Next, in block B310, the forecasting device identifies a sensor that is related to the selected event. In this embodiment, the identified sensor is sensor 1. In some embodiments, to identify a sensor that is related (e.g., relevant) to the event (e.g., the event error or fault), the forecasting device searches the sensor data 1181 of all of the sensors to find a sensor that has sensor data 1181 that was generated at or near the time of the event. And, in some embodiments, the event data 1191A of event 1 include data that indicate sensor 1.

The flow then proceeds to block B315, where the forecasting device selects sensor data, of the identified sensor, that are within a variance of the time of the occurrence (the epoch of the occurrence of the event). Thus, in FIG. 3 (where the epoch of the selected event is $t_1$), if the variance is v, then the forecasting device would select all of the sensor data 1181A of sensor 1 that are within the range of $t_1-v$ to $t_1+v$.

Next, in block B320, the forecasting device generates (e.g., computes, calculates) one or more characteristics 1171A of the selected sensor data and adds the one or more characteristics 1171A of the selected sensor data to a set of training data 1170. The one or more characteristics 1171A may include one or more of the following: a mean, a median, a standard deviation, an integral, a derivative, a z-series, outliers, and a function. For example, FIG. 4A illustrates an example embodiment of a characteristic of sensor data. In FIG. 4A, the characteristic 1183 of the sensor data 1181 is the integral of the selected sensor data (the sensor data from $t_1-v$ to $t_1+v$) of the sensor data 1181. In some embodiments, for example, the integral is calculated using a linear Bézier curve.

The flow then advances to block B325, where the forecasting device uses the one or more characteristics 1171A to search the sensor data 1181A of the identified sensor (sensor 1 in this example) for other occurrences of the event. In FIG. 3, the sensor data 1181A of sensor 1 include another occurrence of the event at $t_2$. The forecasting device may identify the other occurrences of the event by finding sensor data that are similar or identical to the one or more characteristics 1171A. For example, FIG. 4B illustrates an example embodiment of sensor data that include multiple occurrences of an event. In FIG. 4B, as indicated by the three sets of sensor data 1185 that are similar or identical to the characteristic 1183 in FIG. 4A, the sensor data 1181 include three occurrences of the event that corresponds to the characteristic 1183 in FIG. 4A.

Next, in block B330, the forecasting device calculates the respective time differences 1175 between occurrences of the event. For example, the forecasting device may calculate a time difference by calculating a time difference between $t_1$ and $t_2$.

Then, in block B335, the forecasting device selects sensors that are related to an occurrence of the event. For example, the forecasting device may select sensors that generated sensor data 1181 within the variance of the epoch of an occurrence. Depending on the sampling interval of a sensor, the sensor may not generate sensor data within the variance of an epoch. In the example in FIG. 3, sensor 2 and sensor n generated data within the variance of an epoch.

However, sensor 3 did not. Thus, in this example the forecasting device would select sensor 2 and sensor n, but not sensor 3.

The flow then moves to block B340, where the forecasting device generates respective characteristics 1171 of the sensor data, of the selected sensors, that are within the variance of an epoch of an occurrence of the event. The forecasting device adds the respective characteristics 1171 to the training data 1170.

Next, in block B345, the forecasting device calculates co-regressions 1174 (e.g., correlations) between the sensor data of the selected sensors. For example, the forecasting device may calculate the co-regression between the sensor data 1181A of sensor 1 and the sensor data 1181B of sensor 2, the co-regression between the sensor data 1181A of sensor 1 and the sensor data 1181D of sensor n, and the co-regression between the sensor data 1181B of sensor 2 and the sensor data 1181D of sensor n. The forecasting device adds the co-regressions 1174 to the training data 1170.

The flow then moves to block B350, where the forecasting device trains a machine-learning model 1178 using the training data 1170 and at least some of the sensor data 1181 (e.g., all sensor data, any sensor data that was generated within a certain window of time, such as a variance of an epoch). Also, the forecasting device may normalize at least some of the data that are used to train the machine-learning model 1178 based on one or more of the characteristics 1171 (e.g., normalize the sensor data 1181 to a standard deviation (between −1 and 1)). Thus, some embodiments of the forecasting device use one or more of the characteristics 1171 to normalize the sensor data. Additionally, for example, if the machine-learning model is a neural network (e.g., a multilayer perceptron), then the co-regressions may be used to weight the nodes in a hidden layer of the neural network.

The sensor data that are within the variance of an epoch can be used as negative training data (training data that indicate an error), and the sensor data that are not within the variance of an epoch can be used as positive training data (training data that do not indicate an error). The negative training data may be distinguished from the positive training data by adding one or more characteristics that were generated in block B320 or B340 to the negative training data or by adding a respective label to the training data (e.g., labeling the positive training data with 0 and labeling the negative training data with 1). For example, FIG. 4C illustrates an example embodiment of sensor data that include characteristics for the negative training data and that do not include characteristics for positive training data.

Also, in block B350, the forecasting device generates a virtual sensor 1189 for detecting the event. The virtual sensor 1189 includes the event code 1173 and the characteristics 1171 (e.g., integral), and may include the co-regressions 1174, the epoch 1172, or the time difference 1175. The virtual sensor 1189 corresponds to the machine-learning model 1178.

Then the flow in FIG. 3 ends in block B355.

Figure 5:
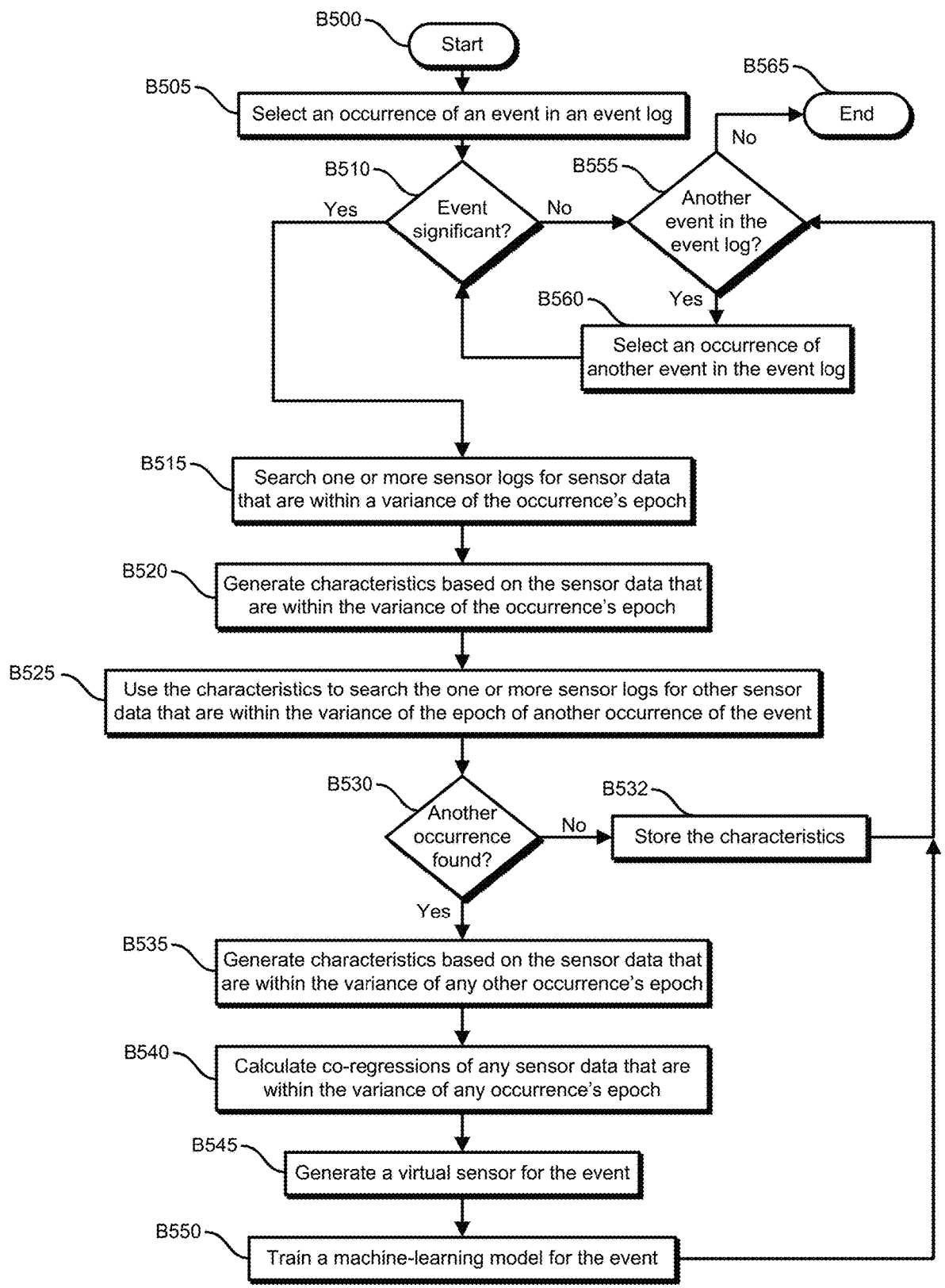
FIG. 5 illustrates an example embodiment of an operational flow for training one or more machine-learning models and generating one or more virtual sensors.

The forecasting device may generate a respective machine-learning model 1178 and a respective virtual sensor 1189 for multiple events. For example, FIG. 5 illustrates an example embodiment of an operational flow for training one or more machine-learning models and generating one or more virtual sensors. The flow starts in block B500 and moves to block B505, where a forecasting device selects an occurrence of an event in an event log. Next, in block B510, the forecasting device determines if the event is significant. For example, the forecasting device may determine that the event is significant if the event requires a visit from a technician to resolve the event, if the event requires a certain replacement part, if the event requires a certain number of operations to resolve, or if the event requires at least a certain minimum amount of time to resolve. The information used to determine whether the event is significant may be stored in the forecasting device (e.g., a table that include event codes and a respective significance rating for each event code). If the forecasting device determines that the event is significant (B510=Yes), then the flow moves to block B515. If the forecasting device determines that the event is not significant (B510=No), then the flow moves to block B550. Thus, the forecasting device may not generate a machine-learning model and a virtual sensor for events that are easy to resolve (e.g., an open-door event of an image-forming device, a low-paper event of an image-forming device).

In block B515, the forecasting device searches one or more sensor logs for sensor data that are within a variance of the occurrence's epoch. The forecasting device may stop the search once the forecasting device finds some sensor data, from a corresponding sensor, that are within a variance of the occurrence's epoch. Next, in block B520, the forecasting device generates characteristics based on the sensor data that are within a variance of the occurrence's epoch. The flow then advances to block B525, where the forecasting device uses the characteristics to search the one or more sensor logs for other sensor data that are within the variance of the epoch of another occurrence of the event. Additionally, some embodiments of the forecasting device use the epochs of the occurrences of an event in the event log to search the one or more sensor logs for sensor data that are within a variance of an epoch of an occurrence. For example, some embodiments of the forecasting device locate all of the occurrences of an event in the event log, then locate all of the sensor data in the one or more sensor logs that are within a variance of an epoch of an occurrence of the event.

Next, in block B530, the forecasting device determines if another occurrence of the event was found in block B525. If another occurrence was not found (B530=No), then the flow moves to block B532, where the characteristics are stored, and then to block B555. If another occurrence was found (B530=Yes), then the flow proceeds to block B535. In block B535, the forecasting device generates characteristics based on the sensor data that are with the variance the epoch of any other occurrences of the event (any occurrence that was found in block B525). Next, in block B540, the forecasting device calculates co-regressions of any sensor data that are within the variance of any occurrence's epoch. Then, in block B545, the forecasting device generates a virtual sensor for the event and, in block B550, trains a machine-learning model for the event. In block B550, when training the machine-learning model, the forecasting device may normalize the sensor data based on the characteristics. The flow then moves to block B555.

If, in block B510, the forecasting device determines that the event is not significant (B510=No), then the flow proceeds to block B555, where the forecasting device determines whether the event log includes another event (an event for which a machine-learning model and a virtual sensor have not been generated). If the forecasting device determines that the event log includes another event (an occurrence of another event) (B555=Yes), then the flow advances to block B560. In block B560, the forecasting device selects an occurrence of another event in the event log, and then the flow returns to block B510. If the forecasting device determines that the event log does not include another event (does not include an occurrence of another event) (B555=No), then the flow ends in block B565.

Figure 6:
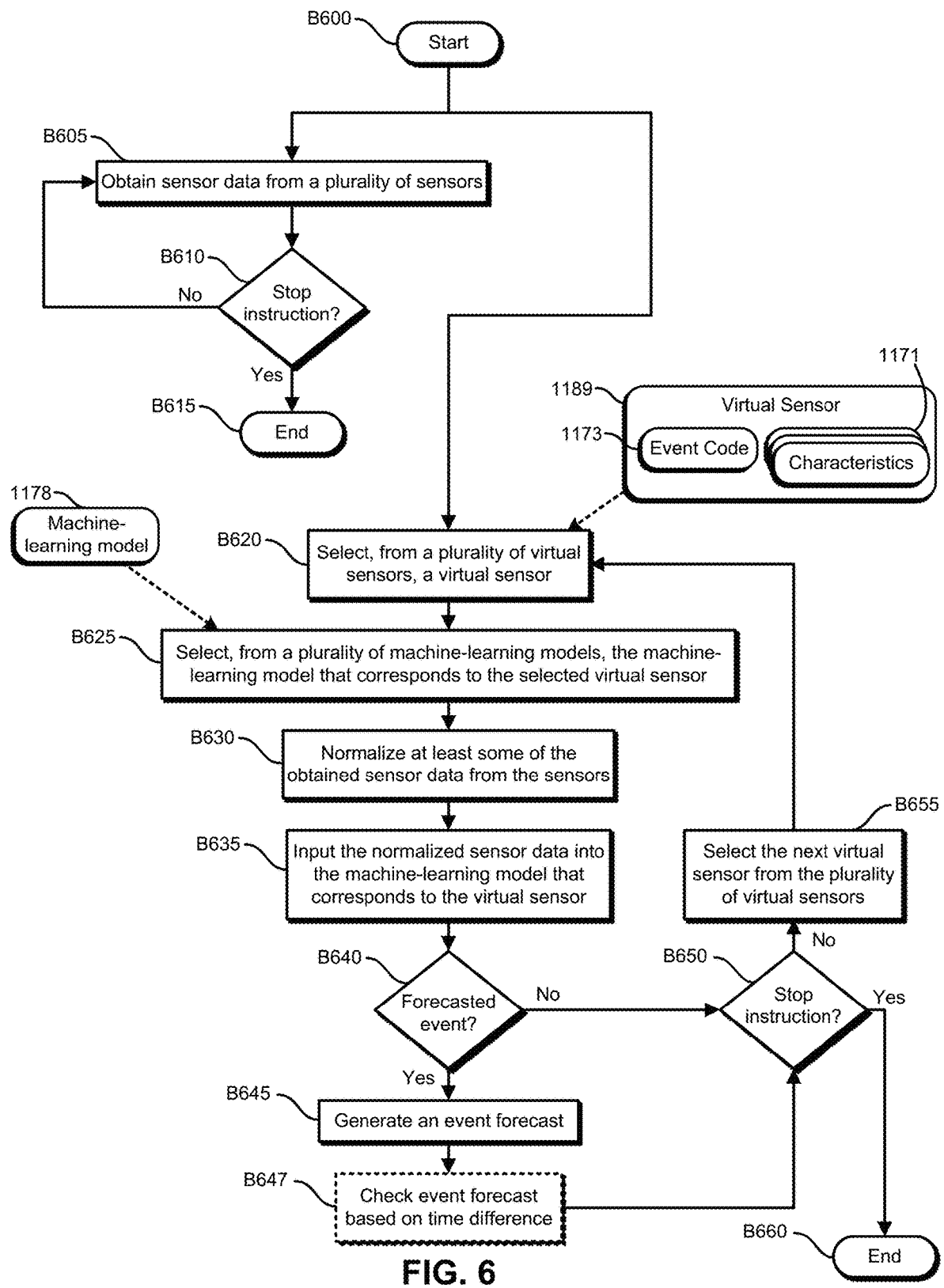
FIG. 6 illustrates an example embodiment of an operational flow for predicting future events.

FIG. 6 illustrates an example embodiment of an operational flow for predicting future events. The flow begins in block B600 and then splits into a first flow and a second flow. The forecasting device may simultaneously perform the first flow and the second flow.

The first flow moves to block B605, where the forecasting device obtains sensor data from a plurality of sensors in a sensor-data-generating device. For example, the forecasting device may obtain, via a network, sensor data from a plurality of sensors in a sensor-data-generating device and store the obtained sensor data in one or more sensor logs. Next, in block B610, the forecasting device determines whether a stop instruction has been received. If no stop instruction has been received (B610=No), then the first flow returns to block B605. If a stop instruction has been received (B610=Yes), then the first flow ends in block B615.

The second flow proceeds to block B620, where the forecasting device selects, from a plurality of virtual sensors, a virtual sensor 1189 (which includes an event code 1173 and respective characteristics 1171). Then, in block B625, the forecasting device selects, from a plurality of machine-learning models, the machine-learning model 1178 that corresponds to the selected virtual sensor.

Next, in block B630, the forecasting device normalizes at least some of the obtained sensor data, for example based on one or more characteristics 1171 (e.g., standard deviation, mean, median) that are included in the virtual sensor 1189.

The second flow then proceeds to block B635, where the forecasting device inputs the normalized sensor data into the machine-learning model 1178 that corresponds to the virtual sensor. For example, the input sensor data may be sensor data that was obtain within a certain time window. And some embodiments of the forecasting device also generate one or more characteristics of the at least some sensor data and input the characteristics into the machine-learning model.

The second flow then moves to block B640, where the forecasting device determines if the machine-learning model outputs a forecasted event (e.g., outputs an abnormal indicator). For example, in some embodiments the machine-learning model 1178 output can have one of two values (e.g., "normal" and "abnormal", "0" and "1"), and a forecasted event is indicated by one of the two values (e.g., by "abnormal", by "1"). If the machine-learning model outputs a forecasted event (B640=Yes), then the second flow moves to block B645. If the machine-learning model did not output a forecasted event (B640=No), then the second flow moves to block B650.

In block B645, the forecasting device generates an event forecast, which may include an event code and a forecasted time of an occurrence of the event. The forecasted time of the event may be based on one or more previously calculated time differences (e.g., time differences 1175 in FIG. 3). Also, the forecasting device may send the event forecast to one or more client devices. In some embodiments, the second flow then proceeds to block B650. However, in some embodiments, the flow moves to block B647 before sending the event forecast to the one or more client devices. In block B647, the forecasting device checks the event forecast based on one or more previously calculated time differences between occurrences of events (e.g., time differences 1175 in FIG. 3). If the time between the forecasted event and the previous occurrence of the event is too dissimilar to the one or more time differences, then the forecasting device may discard the event forecast without sending the event forecast to the one or more client devices. After block B647, the flow then moves to block B650.

In block B650, the forecasting device determines if a stop instruction has been received. If a stop instruction has not been received (B650=No), then the second flow advances to block B655, where the forecasting device selects the next virtual sensor from the plurality of virtual sensors. The forecasting device may continue to select virtual sensors in a loop until a stop instruction is received. Thus, for example, if the last virtual sensor in a list of virtual sensors is the most recently selected virtual sensor, then the forecasting device may select the first virtual sensor in the list. The second flow then returns to block B620.

If a stop instruction has been received (B650=Yes), then the second flow ends in block B660.

Also, some embodiments of the forecasting device simultaneously perform blocks B625-B650 for each virtual sensor. For example, some embodiments of the forecasting device include ten virtual sensors and, in ten simultaneously performed operational flows (e.g., in a respective thread for each virtual sensor), repeatedly perform blocks B630-650 for each virtual sensor.

Figure 7:
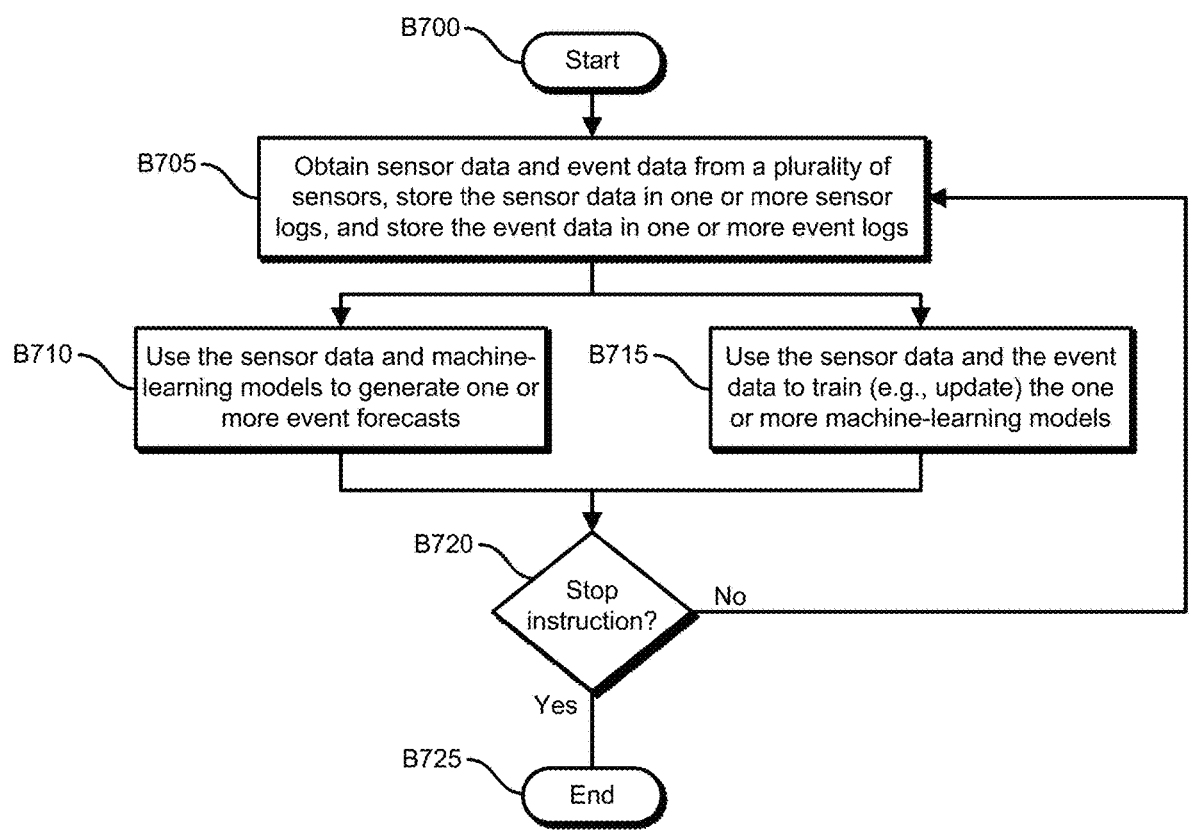
FIG. 7 illustrates an example embodiment of an operational flow for predicting future events.

FIG. 7 illustrates an example embodiment of an operational flow for predicting future events. The flow starts in block B700 and then moves to block B705, where a forecasting device obtains sensor data and event data from a plurality of sensors, stores the sensor data in one or more sensor logs, and stores the event data in one or more event logs. The flow then splits into a first flow and a second flow. The first flow moves to block B710, where the forecasting devices uses the sensor data and one or more machine-learning models to generate one or more event forecasts (e.g., as described in blocks B720-B755 in FIG. 6). The first flow then proceeds to block B720.

The second flow moves to block B715, where the forecasting device uses the sensor data and the event data to train (e.g., update) the one or more machine-learning models (e.g., as described in FIG. 3 or in FIG. 5). For example, if the forecasting device receives the event data for an event, the forecasting device can determine if a virtual sensor that corresponds to the event has already been generated. If a virtual sensor has not been created, then the forecasting device could select the event and generate a virtual sensor and a machine-learning model for the event (e.g., as described in FIG. 3). If a virtual sensor was previously created, then the forecasting device could select the event and update the virtual sensor and the machine-learning model for the event (e.g., by performing the operations in FIG. 3 again). The second flow then advances to block B720.

In block B720, the forecasting device determines if a stop instruction has been received. If no stop instruction has been received (B720=No), then the flow returns to block B705. If a stop instruction has been received (B720=Yes), then the flow ends in block B725.

Thus, the forecasting device may use obtained sensor data and event data to continually and simultaneously generate event notifications and train machine-learning models.

Figure 8:
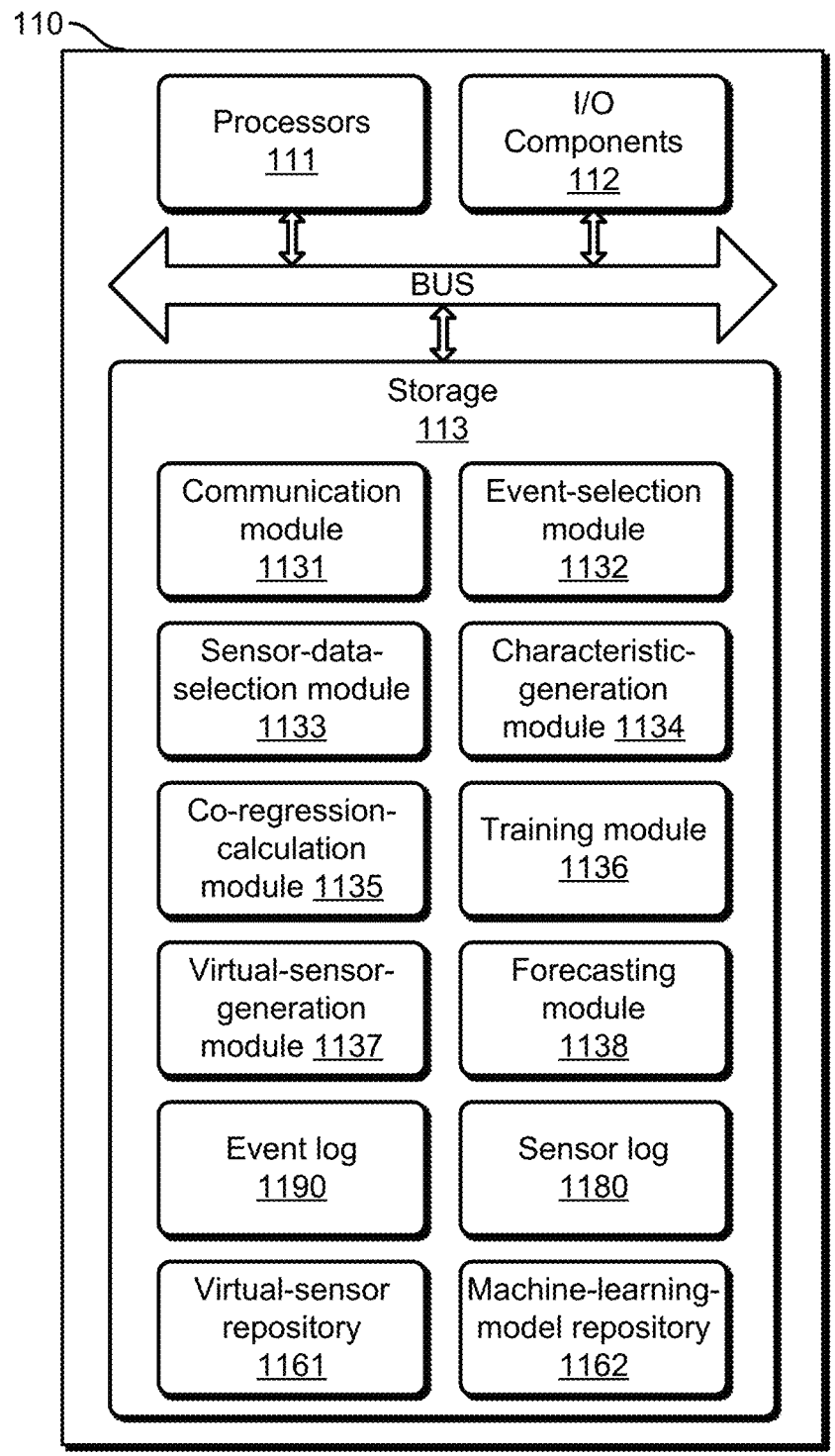
FIG. 8 illustrates an example embodiment of a forecasting device.

FIG. 8 illustrates an example embodiment of a forecasting device. The forecasting device 110 includes one or more processors 111, one or more I/O components 112, and storage 113. Also, the hardware components of the forecasting device 110 communicate via one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 111 include one or more central processing units (CPUs), which may include one or more microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 112 include communication components (e.g., a graphics card, a network-interface controller) that communicate with one or more sensor-data-generating devices, one or more networks, one or more client computing devices, and other input or output devices (not illustrated), which may include a display device, a keyboard, a mouse, a touch screen, a light pen, an optical-storage device, a scanner, a microphone, and a drive.

The storage 113 includes one or more computer-readable storage media. As used herein, a computer-readable storage medium includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 113, which may include both ROM and RAM, can store computer-readable data or computer-executable instructions. And the storage 113 includes an event log 1190, a sensor log 1180, a virtual-sensor repository 1161, and a machine-learning-model repository 1162. The event log 1190 stores event data, and the sensor log 1180 stores sensor data. The virtual-sensor repository 1161 stores data that define one or more virtual sensors. And the machine-learning-model repository 1162 stores data that define one or more machine-learning models.

The forecasting device 110 also includes a communication module 1131, an event-selection module 1132, a sensor-data-selection module 1133, a characteristic-generation module 1134, a co-regression-calculation module 1135, a training module 1136, a virtual-sensor-generation module 1137, and a forecasting module 1138. A module includes logic, computer-readable data, or computer-executable instructions. In the embodiment shown in FIG. 8, the modules are implemented in software (e.g., Assembly, C, C++, C#, Java, BASIC, Perl, Visual Basic, Python). However, in some embodiments, the modules are implemented in hardware (e.g., customized circuitry) or, alternatively, a combination of software and hardware. When the modules are implemented, at least in part, in software, then the software can be stored in the storage 113. Also, in some embodiments, the forecasting device 110 includes additional or fewer modules, the modules are combined into fewer modules, or the modules are divided into more modules.

The communication module 1131 includes instructions that cause the forecasting device 110 to communicate with one or more other devices, for example to obtain sensor data and event data from a sensor-data-generating device, to store obtained sensor data in the sensor log 1180, to store the event data in the event log 1190, or to send event forecasts to one or more client devices. For example, some embodiments of the communication module 1131 include instructions that cause the forecasting device 110 to perform at least some of the operations that are described in block B605 in FIG. 6, in block B710 in FIG. 7, or in block B805 of FIG. 8.

The event-selection module 1132 includes instructions that cause the forecasting device 110 to select one or more occurrences of events in the event log 1190. For example, some embodiments of the event-selection module 1132 include instructions that cause the forecasting device 110 to perform at least some of the operations that are described in block B305 in FIG. 3 or in blocks B505, B555, and B560 in FIG. 5.

The sensor-data-selection module 1133 includes instructions that cause the forecasting device 110 to search one or more sensor logs and select sensor data, such as sensor data that is within a variance of an event occurrence's epoch or sensor data that includes one or more characteristics. For example, some embodiments of the sensor-data-selection module 1133 include instructions that cause the forecasting device 110 to perform at least some of the operations that are described in blocks B310-B315 and B325 in FIG. 3 or in blocks B515 and B525 in FIG. 5.

The characteristic-generation module 1134 includes instructions that cause the forecasting device 110 to generate one or more characteristics of sensor data. For example, some embodiments of the characteristic-generation module 1134 include instructions that cause the forecasting device 110 to perform at least some of the operations that are described in blocks B320 and B340 in FIG. 3 or in blocks B520 and B535 in FIG. 5.

The co-regression-calculation module 1135 includes instructions that cause the forecasting device 110 to calculate co-regressions (e.g., correlations) between sensor data. For example, some embodiments of the co-regression-calculation module 1135 include instructions that cause the forecasting device 110 to perform at least some of the operations that are described in block B345 in FIG. 3 or in block B540 in FIG. 5.

The training module 1136 includes instructions that cause the forecasting device 110 to train one or more machine-learning models (e.g., neural networks) and to store the machine-learning models in the machine-learning-model repository 1162. For example, some embodiments of the training module 1136 include instructions that cause the forecasting device 110 to perform at least some of the operations that are described in block B350 in FIG. 3 or in block B550 in FIG. 5.

The virtual-sensor-generation module 1137 includes instructions that cause the forecasting device 110 to generate virtual sensors for respective events and to store the virtual sensors in the virtual-sensor repository 1161. For example, some embodiments of the virtual-sensor-generation module 1137 include instructions that cause the forecasting device 110 to perform at least some of the operations that are described in block B350 in FIG. 3 or in block B545 in FIG. 5.

The forecasting module 1138 includes instructions that cause the forecasting device 110 to generate one or more event forecasts. For example, some embodiments of the forecasting module 1138 include instructions that cause the forecasting device 110 to perform at least some of the operations that are described in blocks B620-B655 in FIG. 6.

Figure 9:
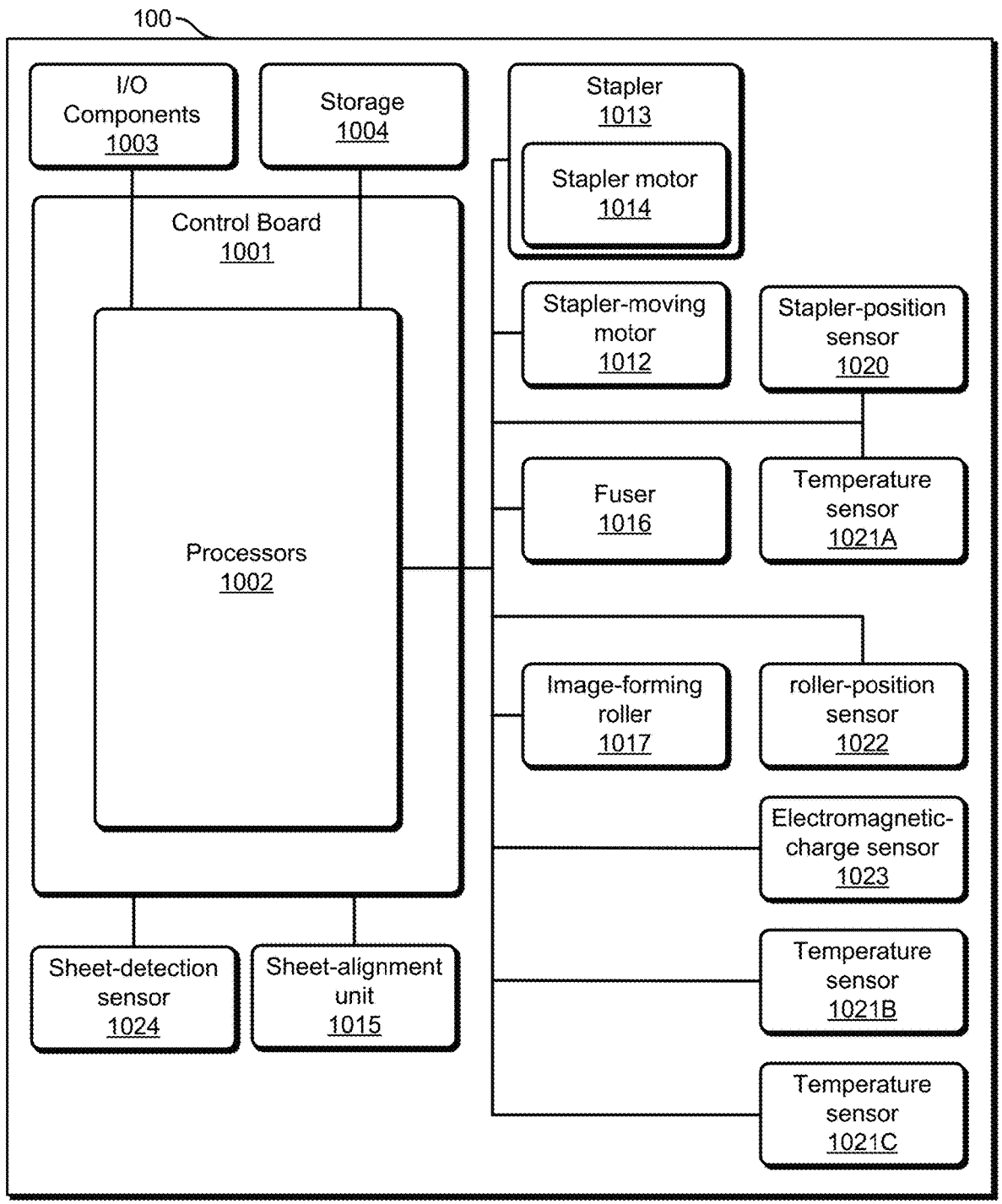
FIG. 9 illustrates an example embodiment of a sensor-data-generating device.

FIG. 9 illustrates an example embodiment of a sensor-data-generating device 100. In this embodiment, the sensor-data-generating device 100 is an image-forming device. The sensor-data-generating device 100 includes a control board 1001, one or more processors 1002, one or more I/O components 1003, storage 1004, a stapler 1013, a stapler motor 1014, a stapler-moving motor 1012, a sheet alignment unit 1015, a fuser 1016, and an image-forming roller 1017.

The sensor-data-generating device 100 also includes a plurality of sensors, which monitor the components of the sensor-data-generating device 100. In this embodiment, the sensors include a stapler-position sensor 1020, temperature sensors 1021, a roller-position sensor 1022, an electromagnetic-charge sensor 1023, and a sheet-detection sensor 1024. Some embodiments of the sensor-data-generating device 100 include dozens or hundreds of sensors.

The one or more processors 1002 obtain sensor data that were generated by the sensors and send the sensor data to one or more forecasting devices 110. The one or more forecasting devices 110 use the sensor data to forecast events in the sensor-data-generating device 100, such as a failure of a bearing of the image-forming roller 1017, a failure of the fuser 1016, or a need for a maintenance operation of the sheet-alignment unit 1015.

Figure 10:
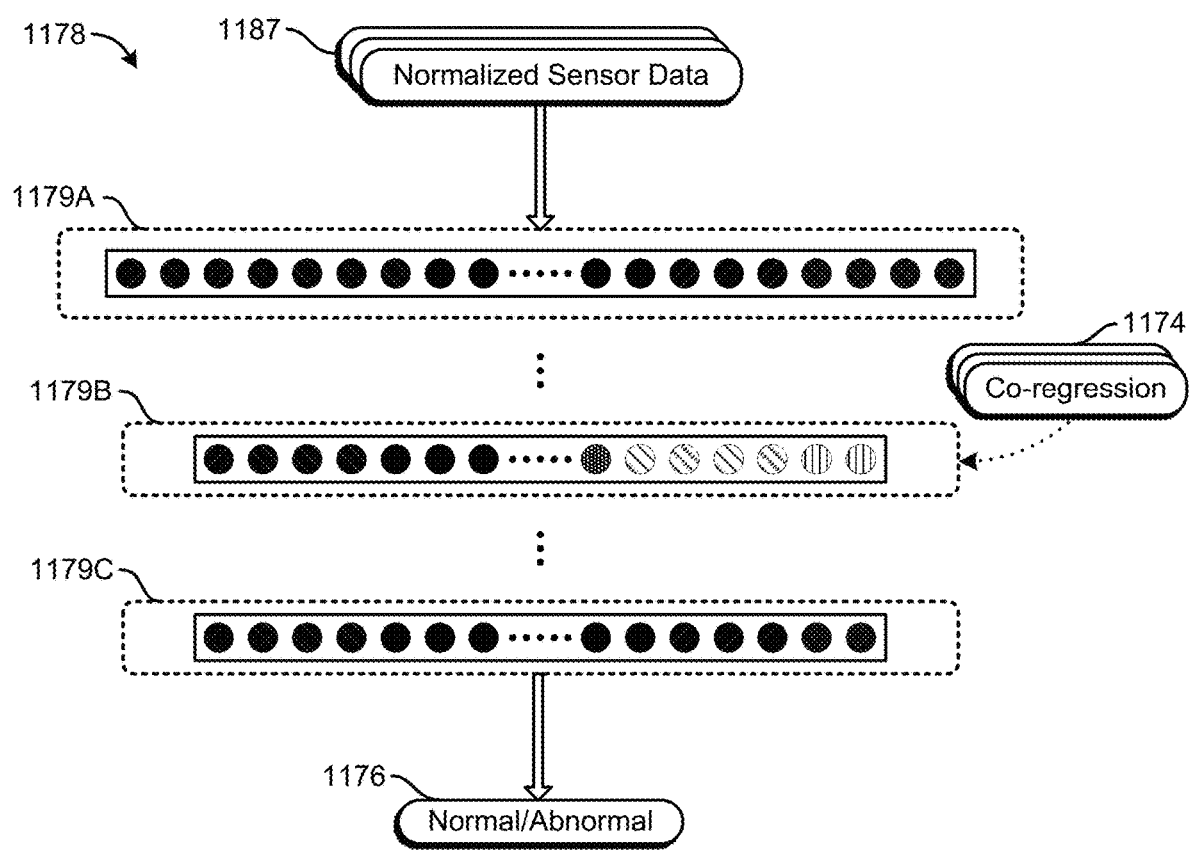
FIG. 10 illustrates an example embodiment of a machine-learning model.

FIG. 10 illustrates an example embodiment of a machine-learning model. In this embodiment, the machine-learning model 1178 is a neural network that includes an input layer 1179A, an output layer 1179C, and at least one hidden layer 1179B. The machine-learning model 1178 is trained using normalized sensor data 1187, which may include sensor data 1181 that were normalized based on one or more characteristics 1171, and a binary output value 1176 (e.g., either a normal or a normal value). Thus, some normalized sensor data 1185 that correspond to a normal output value 1176 are used to train the machine-learning model 1178, and some normalized sensor data 1185 that correspond to an abnormal output value 1176 are used to train the machine-learning model 1178. Also, in this embodiment, the weights of the nodes in the hidden layer 1179B are each equal to a respective co-regression 1174 (the shading in FIG. 10 indicates some nodes that are weighted to have a strong relationship to each other). In embodiments that include more than one hidden layer, the hidden layer that is weighted according to the co-regressions 1174 may be the hidden layer that is closest to the input layer (e.g., layer 1179A).

Additionally, some embodiments of the devices, systems, and methods combine features from two or more of the embodiments that are described herein. And while the present disclosure has described exemplary embodiments, some embodiments are not limited to the exemplary embodiments described herein.

What is claimed is:

1. A device comprising:
   one or more computer-readable media; and
   one or more processors in communication with the one or more computer-readable media,
   wherein the one or more computer-readable media and the one or more processors are configured to cause the device to:
   obtain sensor data that were generated by a plurality of sensors,
   select a first event code, corresponding first characteristics, and a corresponding first machine-learning model, wherein the first event code corresponds to a first event,
   normalize at least some of the sensor data based on the corresponding first characteristics,
   input the normalized sensor data into the corresponding first machine-learning model, which produces a first output, wherein the corresponding first machine-learning model was trained based, at least in part, on first extracted sensor data that were generated within a temporal range of a time of a first occurrence of the first event and on second extracted sensor data that were generated within the temporal range of a time of a second occurrence of the first event, and wherein the first extracted sensor data and the second extracted sensor data were extracted from sensor data that included additional sensor data that were not generated within the temporal range of a time of any occurrence of the first event, and
   in a case where the first output indicates a forecasted occurrence of the first event, calculate a future time of the forecasted occurrence of the first event and output the future time and an indication of the forecasted occurrence of the first event.

2. The device of claim 1, wherein the forecasted occurrence of the first event includes the first event code.

3. The device of claim 1, wherein the future time is a range of time that both begins and ends in the future.

4. The device of claim 1, wherein, to calculate the future time of the forecasted occurrence of the first event, the one or more computer-readable media and the one or more processors are further configured to cause the device to:
   obtain previously calculated time intervals between occurrences of the first event, and
   calculate the future time of the forecasted occurrence of the first event based on the previously calculated time intervals between occurrences of the first event.

5. The device of claim 1, wherein the one or more computer-readable media and the one or more processors are further configured to cause the device to:
   select a second event code, corresponding second characteristics, and a corresponding second machine-learning model, wherein the second event code corresponds to a second event;
   normalize at least some of the sensor data based on the corresponding second characteristics;
   input the normalized sensor data into the corresponding second machine-learning model, which produces a second output; and
   in a case where the second output indicates a forecasted occurrence of the second event, calculate a second future time of the forecasted occurrence of the second event and output the second future time and an indication of the forecasted occurrence of the second event.

6. The device of claim 1, wherein the first machine-learning model is a neural network.

7. The device of claim 1, wherein the first event is an error, a fault, or a malfunction of a sensed device.

8. The device of claim 1, wherein the corresponding first characteristics were generated based on the first extracted sensor data.

9. The device of claim 8, wherein the corresponding first characteristics were generated further based on the second extracted sensor data.

10. A method comprising:
    obtaining sensor data that were generated by a plurality of sensors;
    selecting a first event code, corresponding first characteristics, and a corresponding first machine-learning model, wherein the first event code corresponds to a first event, and wherein the corresponding first machine-learning model was trained based, at least in part, on first extracted sensor data that were generated within a temporal range of a time of a first occurrence of the first event and on second extracted sensor data that were generated within the temporal range of a time of a second occurrence of the first event, and wherein the first extracted sensor data and the second extracted sensor data were extracted from sensor data that included additional sensor data that were not generated within the temporal range of a time of any occurrence of the first event;

normalizing at least some of the sensor data based on the corresponding first characteristics;

inputting the normalized sensor data into the corresponding first machine-learning model, which produces a first output; and in a case where the first output indicates a forecasted occurrence of the first event, calculating a future time of the forecasted occurrence of the first event and outputting the future time and an indication of the forecasted occurrence of the first event.

11. The method of claim 10, wherein the future time is at least four hours in the future.

12. The method of claim 10, wherein the future time is a range of time that both begins and ends in the future.

13. The method of claim 10, further comprising:
obtaining previously calculated time intervals between occurrences of the first event,
wherein the future time of the forecasted occurrence of the first event is calculated based on the previously calculated time intervals between occurrences of the first event.

14. The method of claim 10, further comprising:
selecting a second event code, corresponding second characteristics, and a corresponding second machine-learning model, wherein the second event code corresponds to a second event;
normalizing at least some of the sensor data based on the corresponding second characteristics;
inputting the normalized sensor data into the corresponding second machine-learning model, which produces a second output; and
in a case where the second output indicates a forecasted occurrence of the second event, calculating a second future time of the forecasted occurrence of the second event and outputting the second future time and an indication of the forecasted occurrence of the second event.

15. One or more non-transitory computer-readable media storing instructions that, when executed by one or more computing devices, cause the one or more computing devices to perform operations comprising:
obtaining sensor data that were generated by a plurality of sensors;
selecting a first event code, corresponding first characteristics, and a corresponding first machine-learning model, wherein the first event code corresponds to a first event, and wherein the corresponding first machine-learning model was trained based, at least in part, on first extracted sensor data that were generated within a temporal range of a time of a first occurrence of the first event and on second extracted sensor data that were generated within the temporal range of a time of a second occurrence of the first event, and wherein the first extracted sensor data and the second extracted sensor data were extracted from sensor data that included additional sensor data that were not generated within the temporal range of a time of any occurrence of the first event;

normalizing at least some of the sensor data based on the corresponding first characteristics;

inputting the normalized sensor data into the corresponding first machine-learning model, which produces a first output; and in a case where the first output indicates a forecasted occurrence of the first event, calculating a future time of the forecasted occurrence of the first event and outputting the future time and an indication of the forecasted occurrence of the first event.

16. The one or more non-transitory computer-readable media of claim 15, wherein a device includes the plurality of sensors, and
wherein the first event is an event that can be prevented by performing service on the device.

17. The one or more non-transitory computer-readable media of claim 15, wherein the future time is a range of time that both begins and ends in the future.

18. The one or more non-transitory computer-readable media of claim 15, wherein the operations further comprise:
obtaining previously calculated time intervals between occurrences of the first event,
wherein the future time of the forecasted occurrence of the first event is calculated based on the previously calculated time intervals between occurrences of the first event.

19. The one or more non-transitory computer-readable media of claim 15, wherein the operations further comprise:
selecting a second event code, corresponding second characteristics, and a corresponding second machine-learning model, wherein the second event code corresponds to a second event;
normalizing at least some of the sensor data based on the corresponding second characteristics;
inputting the normalized sensor data into the corresponding second machine-learning model, which produces a second output; and
in a case where the second output indicates a forecasted occurrence of the second event, calculating a second future time of the forecasted occurrence of the second event and outputting the second future time and an indication of the forecasted occurrence of the second event.

20. The one or more non-transitory computer-readable media of claim 15, wherein the first machine-learning model is a neural network.

* * * * *